Patented June 2, 1942

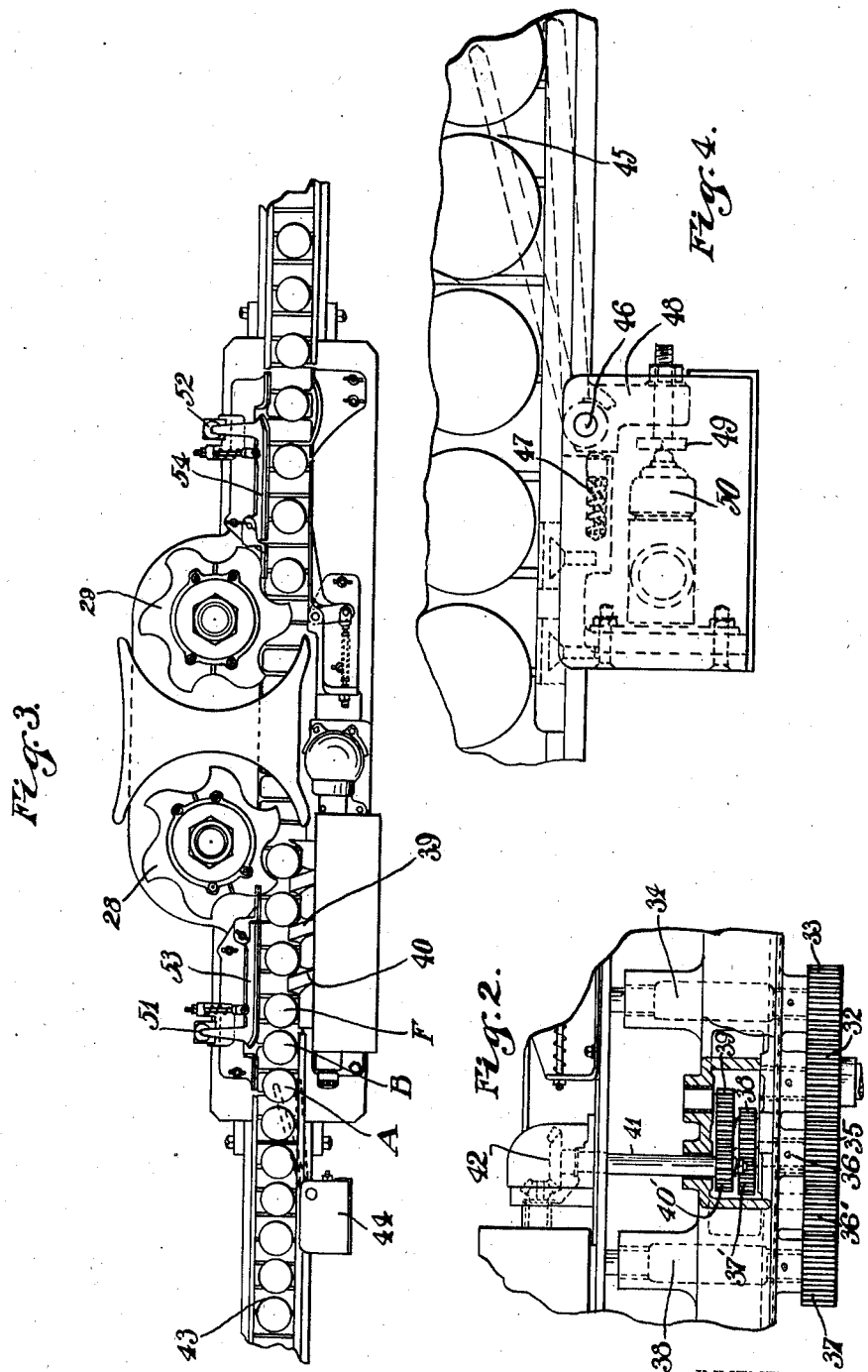

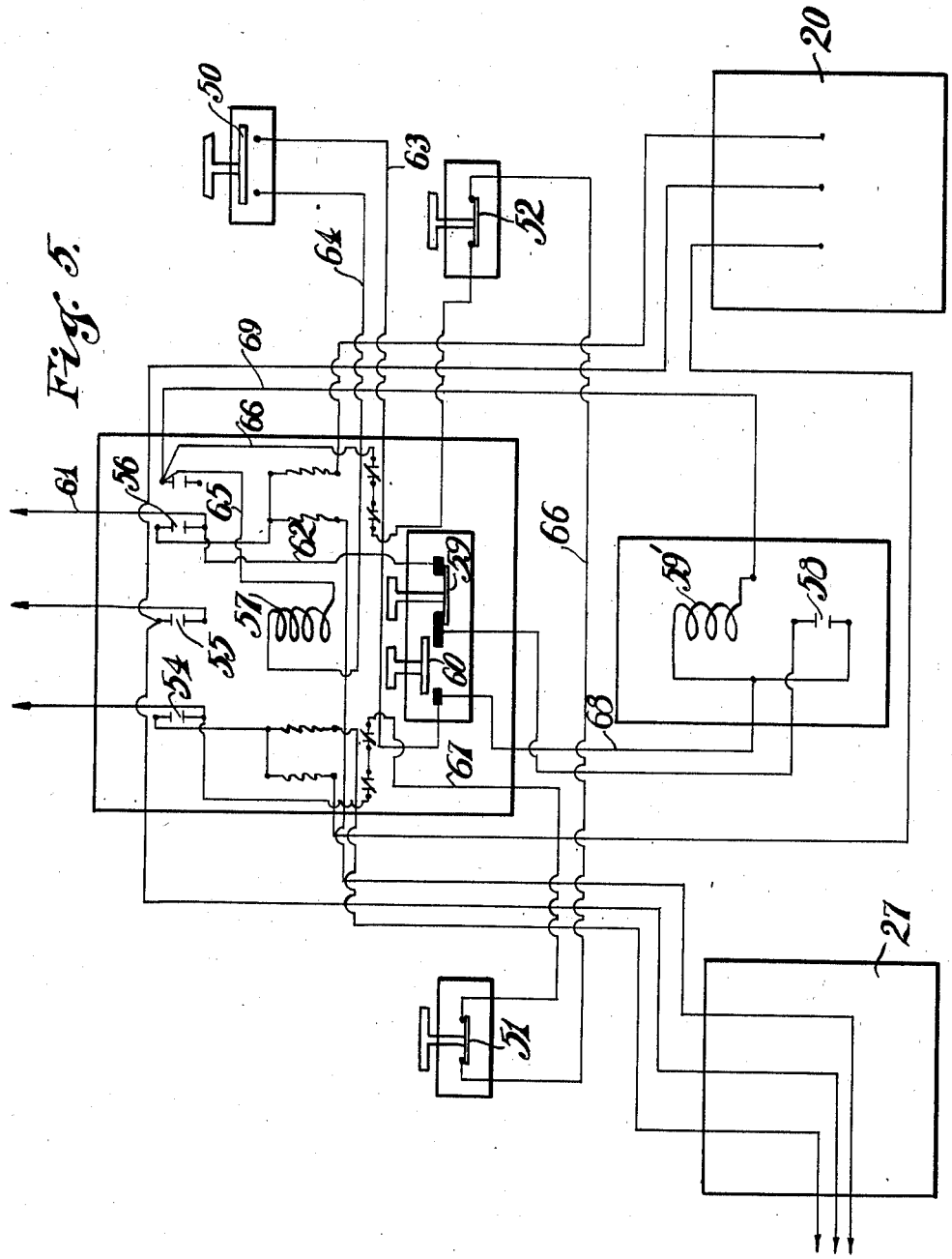

2,285,284

UNITED STATES PATENT OFFICE 2,285,284

TIMING FEED OF BEVERAGE MIXING MACHINES AND THE LIKE

James Kantor, Chicago, Ill., assignor to The Liquid Carbonic Corporation, Chicago, Ill., a corporation of Delaware Application September 16, 1940, Serial No. 356,902

3 Claims. (Cl. 192—125)

The present invention relates to feed control mechanism for container handling apparatus. The invention is primarily adapted for the feed control to a machine intended for agitating the bottles or containers of carbonated beverages after the containers have been filled for the purpose of more thoroughly mixing the contents of the container.

While the invention is primarily adapted for controlling the feed of containers to such mixing machines, it is also adapted for various other types of container handling machines such for instance as container filling machines and the like.

One of the objects of the invention is to provide a container feed for bottle handling apparatus wherein the containers are delivered to the handling apparatus singly and in proper spaced relation to be received by the handling mechanism in regular order.

In the commercial use of container handling machines of the above type, the containers are delivered to the machine through the medium of a traveling conveyor which is continuously driven. It some times happens that the containers are placed on the conveyor in irregularly spaced intervals or in such a manner that as they approach the feeding mechanism, they may become jammed in the feeding mechanism and resulting in possibly crushing of the containers, or at least a pile-up of the containers behind the feeding mechanism, or injury to the container handling machine.

It is one of the objects of my invention to provide a means operating in connection with the container delivering apparatus which will permit the handling machine to operate only during the period of movement of the bottles along the conveyor in their proper order.

The feeding mechanism, for the purpose of illustration, is shown in the accompanying application in connection with a mixing machine and in the accompanying drawings, Fig. 1 is a transverse sectional view of a mixing machine embodying my feeding mechanism, or so much thereof as is necessary for an understanding of the invention;

Fig. 2 is a longitudinal sectional view of the driving mechanism for the timing screw and in- and out-feed stars;

Fig. 3 is a plan view of the feeding mechanism;

Fig. 4 is a detail plan of the controlling switch; and

Fig. 5 is a diagrammatic view of the circuit control for the driving mechanism.

Figure 1:
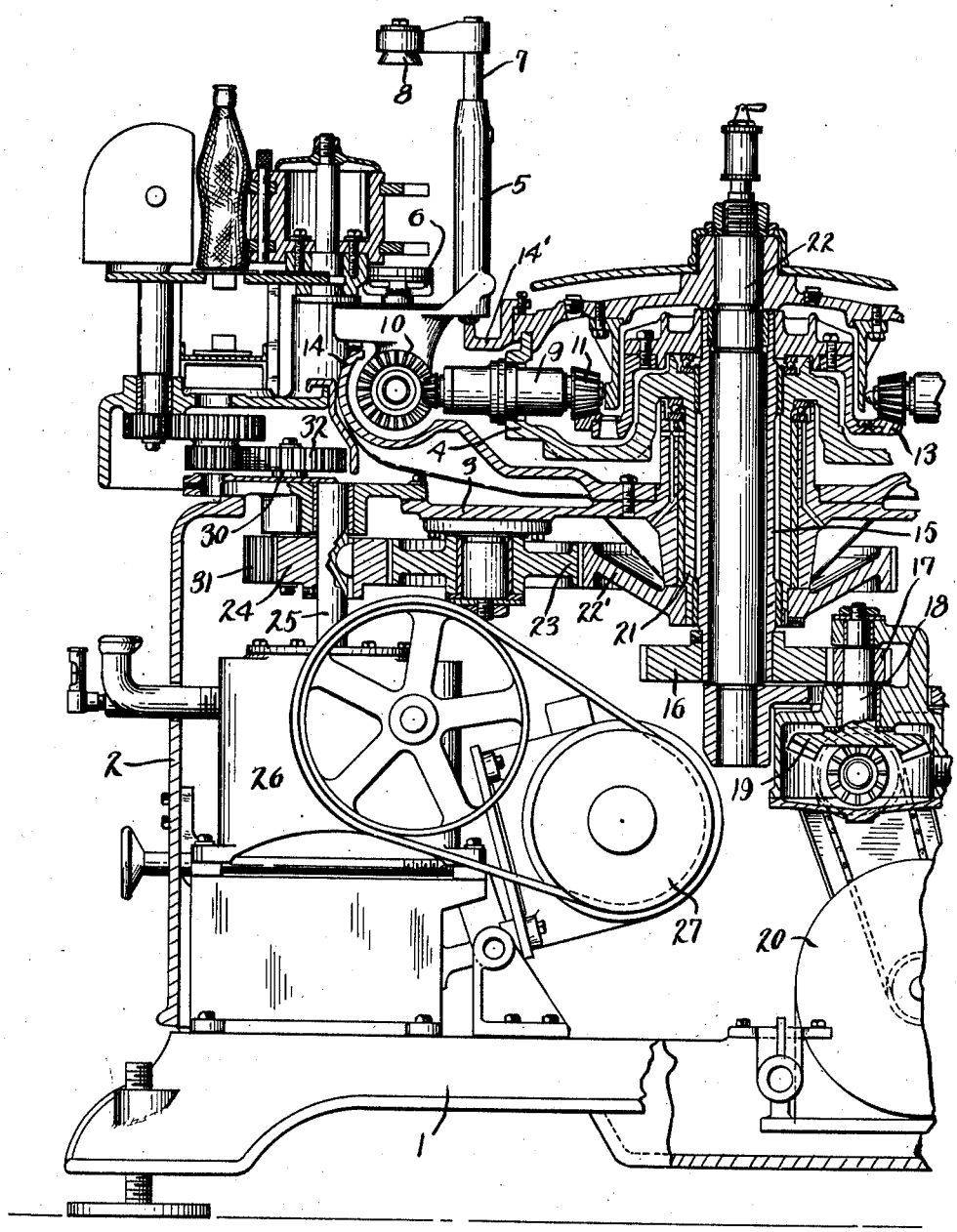

In the embodiment illustrated in the drawings, I provide a mixing machine which embodies a base 1 including sides 2 on which base the apparatus is assembled. On the top 3 of the base, I mount a locating platform 4 which is adapted to carry a plurality of bottle holders 5. Each of these holders includes a supporting platform 6 and a bottle clamp 7. The platform 6 is mounted for rotation and the clamping bell 8 of the clamp 7 is so mounted as to rotate with the container or bottle supported on the supporting platform 6. There are a plurality of these supporting platforms or bottle holders disposed around the periphery of the member 4 but each of the holders is of exactly the same construction. Each of the platforms 6 is driven through a suitable driving mechanism 9 including a bevel gear drive 10 for the platform and a driving pinion 11. This pinion, in turn, is adapted to mesh with a driving gear 13 so that as the head 4 rotates, the bottles, supported in the clamps 5, are rotated on their own vertical axes at a comparatively high speed. The bottle supporting platforms 6 are also so mounted as to oscillate on a horizontal axis and radially with respect to the support forward to thereby repeatedly tilt and upright the bottle while it is being moved in its orbit, and during the rotation of the bottle on its axis. This tilting and uprighting of the bottle is effected through the medium of a suitable stationary cam 14 with which the underside of the bottle holder is adapted to contact and the opening and closing of the clamp 7 is effected through the medium of a stationary cam 14' with which the underside of the clamp 7 is adapted to contact.

The gear 13 is driven by a vertically disposed sleeve 15 which, at its lower end, carries a gear 16 driven from a gear 17 on a shaft 18, in turn driven by a bevel gear drive 19 operated from an electric motor 20. It is, therefore, to be noted that the motor 20 driving the gear 13 provides a separate source of power for driving this gear from that driving the feed mechanism and the rotating platform. I am thus enabled to rotate the bottle supporting platform 6 independently of the drive for the remaining mechanism of the apparatus.

The support 4 is provided with a vertical sleeve 21 telescoping the sleeve 15, both of which surround a supporting shaft 22 and this sleeve 21 is provided with a gear 22' meshing with idler 23 in turn driven by gear 24 operated from a suitable shaft 25 which is driven through suitable speed control mechanism 26 from an electric motor 27.

The machine is provided with an infeed star 28 and an outfeed star 29 disposed adjacent to one another and adapted to respectively receive the bottle from the delivery mechanism and transfer the same to a bottle support 5 on the mixing machine. After the bottle has completed its orbit of travel on the mixing machine, it is picked up by the outfeed star 29 and transferred from the bottle support 5 to a suitable conveyor, to be more fully hereinafter described.

These infeed and outfeed stars are driven from the gear 24 and to this end, I provide a shaft 30 which, at its lower end is provided with a gear 31 meshing with the gear 24 and at its upper end is provided with a gear 32 which is adapted to drive the stars 28 and 29, as well as the feeding mechanism, to be described more fully hereinafter. This gear 32, referring to Fig. 2, meshes with and drives a gear 33 mounted on the lower end of the drive shaft 34 for the outfeed star 29. This gear also drives a gear 35 and through this gear and an idler 36' a gear 37 mounted on the lower end of the shaft 38 driving the infeed star 28.

For the purpose of feeding the bottles in timed relation to the infeed star 38, I provide a feed worm 39 rotating on a horizontal axis adjacent the infeed star 28 having its spirals 40 so spaced as to receive a single bottle at a time and this worm is rotated in timed relation with the infeed star 28 so that the bottles are fed singly by the worm to the point where they will be picked up by the infeed star and from thence delivered to the mixing machine. This infeed worm is driven from the driving gear 35 which is mounted on a shaft 36. The upper end of this shaft is provided with a gear 37' in turn meshing with a gear 38 upon the same shaft as the gear 39 and thereby driving the gear 39 which, meshing with the gear 40' on the shaft 41, drives through the bevel gearing 42 the infeed worm or screw 39.

A suitable conveyor 43 travels adjacent the infeed and outfeed stars 28 and 29 and adjacent the worm feed 39 and thus conveys the bottles to the worm feed, provides a support for the bottles as they are being moved by the worm feed and provides a conveyor for receiving the bottles from the outfeed star 29 to deliver the bottles wherever desired. This conveyor is driven continuously from a separate source of power and the bottles are fed thereto either from the bottle filling machine or from some other source. As a result, the bottles become irregularly spaced on the conveyor, and under these circumstances, would be improperly fed to or would not arrive at the worm feed in proper relation. So long as a continuous line of bottles is delivered on the conveyor to the worm feed device, the bottles would be picked up by the worm feed device and delivered in their proper relation to the infeed star. However, there are cases where the bottles may be irregularly fed or the spacing between the bottles become so great as to cause trouble, and under these circumstances, it is desirable, and in fact, almost necessary, to stop the operation of the machine. To this end, immediately ahead of the worm feed 39 and adjacent the conveyor, I provide a control switch 44. This switch includes a pivoted arm 45 mounted on a vertical pivot 46 and biased across the top of the conveyor 43 by means of a biasing spring 47, acting on a lever 48 forming a part of the arm 45. This lever is provided with an adjustable pin 49 adapted to engage and operate the switch member 50. So long as the arm 45 projects across the conveyor 43 and in the path of the bottles and there are no bottles moving, the switch 50 will be open and the operation of the mixing machine and its feeding mechanism stopped. With a bottle in the position A on the conveyor, the arm 45 will have been moved into a position substantially parallel with that of the conveyor closing the switch 50 and the mixing machine will run. If there is not a full line of bottles following the bottle at position A, as soon as the bottle moves to the position B, the arm 45 will move across the face of the conveyor, opening the switch 50 and thereby stopping the mixing machine. However, in view of the fact that the conveyor keeps running, while the mixer is stopped, eventually other bottles will be fed to the position to engage the switch arm 45 and thus start the machine so that eventually the bottle will reach the point F where it will be picked up by the feed worm 39 and fed into the machine. If, of course, there are no bottles following to hold the arm in its closed position, the machine will again stop, but as soon as a bottle is fed to a position to close the switch 50, the machine will again start and so long as a continuous stream of bottles is being fed on the conveyor, the switch 50 will be maintained in the closed position permitting the mixing machine to run.

In addition to the above switch mechanism 44, I arrange, for controlling the operation of the mixing machine, a pair of switches 51 and 52. These switches are arranged respectively on the infeed and outfeed side of the conveyor and are controlled respectively by arms 53 and 54 lying parallel with the line of movement of the conveyor. The arrangement is such that if, for any reason, the bottle should jam before they enter the feeding worm 39 and thereby tend to spread out, they would operate the arm 53 thus opening the switch 51. Likewise, if, on the outfeed side of the machine, the bottle should jam on the conveyor as they pass out of the outfeed star 29, this jamming would operate the arm 54 opening the switch 52. The opening of either of the switches 51 or 52 will stop the operation of the machine until after the jam has been cleared out and also necessitate an action on the part of the operator to again start the machine in operation.

For more fully understanding the control by the switches 50, 51 and 52, I have illustrated, in Fig. 5, a diagrammatic view of the circuit arrangement for the control of the machine. In the circuit arrangement, I have indicated an electromagnetically operated switch having the contacts 54, 55 and 56 which control the admission of current to the driving motors 20 and 27. These switch contacts are operated by an electromagnet having a coil 57 whose circuit is controlled by an electromagnetically operated switch 58 operated by an electric magnet having a coil 59' as well as by the switch 50 heretofore referred to.

In addition to the above, I provide a stop button 59 of the push button type and a start button 60 of the push button type. Normally, the stop button 59 is closed and the start button 60 is open, these buttons being biased in the respective positions.

In operation, when the start button 60 is closed, the current will flow from one side 61 of the line over conductor 62 across push button switches 59 and 60 by the way of conductor 63 across switch 50, assuming that the switch 50 is closed, by conductor 64 through the winding 57, thence by conductors 65 and 66 across switches 52 and 51, these switches being normally closed, and thence by conductors 67 back to the opposite side of the line. The energization of the winding 57 will thus close switches 54, 55 and 56, starting motors 20 and 27, thus driving the feed mechanism and the mixing machine. At the same time that circuit is established through the switch 50 by the closing of the push button 60 circuit is also established by conductor 68 through the winding 59' of switch 58 and thence by conductor 69 to the opposite side of the line through switches 51 and 52, as heretofore described. The closing of switch 58 establishes a maintaining circuit so that even though starting button 60 is released, thereby opening the circuit control, a maintaining circuit, including the switches 52 and 51, is established. This maintaining circuit, it will be noted, includes the switches 51 and 52.

If, for any reason, as the failure of the bottle to pass the arm 45 and maintain the same in its closed position, the switch 50 would be opened, thereby opening the circuit through the winding 57, thus opening the switches controlling the motors 20 and 27 permitting the machine to stop. However, as soon as this switch is again closed by the passing of another bottle, the winding 57 would be reenergized, closing the circuit through the motors 20 and 27 and starting the machine again.

If, for any reason, either of the switches 52 and 51 should be opened, then the circuit through the winding 57 and the circuit through the winding 59' would be opened and the only way the machine could again be started would be by closing the starting button 60.

In event that it is desired to stop the machine at any time, the stop button 59 would be pushed, opening the switch and stopping the machine in the same manner as if either switch 51 or 52 would be opened.

It is thus apparent that with the arrangement of the switch 50 in the circuit, as indicated, the motors 20 and 27 may be automatically stopped and started without the necessity on the part of the operator each time of closing the starter button 60. However, if, for any reason, the switches 52 and 51 are opened, it becomes incumbent upon the operator to close the starting switch 60 before the apparatus can again be started up.

I claim as my invention:

1. In combination a container handling apparatus, means for successively feeding the containers to be handled to said apparatus, an electric motor for driving said feeding means, a continuously operated conveyor for delivering a container to said feeding means, a control switch for controlling the operation of said electric motor, a second control switch independent of said first mentioned control switch normally opening the circuit through said electric motor and an arm arranged in the path of the containers as they move over said conveyor moved by the containers to close the circuit through said motor and render the drive of said feeding means operative and a manually controlled switch cooperating with said first-mentioned control switch and operable to start and stop said motor after said first-mentioned switch has stopped the same, said second-mentioned control switch being adapted to start and stop the motor independently of the first-mentioned switch.

2. In combination, a container handling apparatus, means for successively feeding the containers to be handled to said apparatus, an electric motor for driving said feeding means, a continuously operated conveyor for delivering a container to said feeding means, a normally closed control switch adjacent said conveyor and movable into open position for stopping said motor by the lateral displacement of a container on said conveyor, a manual control switch for said electric motor associated with said normally closed switch and circuit connections nessitating the closing of said manual switch after said control switch has been operated to stop the motor for restarting the same, a second control switch, normally open, and means operated by the passage of a container on the conveyor for closing said second-mentioned switch, said second-mentioned switch being adapted to stop and start said motor independently of said first-mentioned switches.

3. In combination, a container handling apparatus, means for successively feeding the containers to be handled to said apparatus, an electric motor for driving said feeding means, a continuously operated conveyor for delivering containers to said feeding means, a control switch for said driving motor, an arm arranged parallel with the path of movement of the containers on said conveyor and movable to open said control switch under the influence of a lateral deflection of a container from its normal path of movement, a manual switch for controlling the operation of said motor, said manual switch being interlocked with said control switch to necessitate the closing of said manual switch to start the motor after said control switch has been operated to stop the motor, a second control switch operating to stop and start the motor independently of said first-mentioned switches, said second mentioned switch being normally open, and an arm controlling said second-mentioned switch lying in the normal path of movement of the containers on said conveyor and adapted to be moved to close said second-mentioned control switch by the passage of a container on said conveyor.

JAMES KANTOR.